(12) United States Patent
Mälkki

(10) Patent No.: US 8,956,502 B2
(45) Date of Patent: Feb. 17, 2015

(54) METHOD FOR SEPARATING THE MAIN COMPONENTS OF LIGNOCELLULOSIC MATERIALS

(75) Inventor: Yrjö Mälkki, Espoo (FI)

(73) Assignee: Cerefi Oy, Espoo (FI)

( * ) Notice: Subject to any disclaimer, the term of this patent is extended or adjusted under 35 U.S.C. 154(b) by 704 days.

(21) Appl. No.: 11/918,527

(22) PCT Filed: Apr. 18, 2006

(86) PCT No.: PCT/FI2006/000118
§ 371 (c)(1),
(2), (4) Date: Jan. 24, 2008

(87) PCT Pub. No.: WO2006/111604
PCT Pub. Date: Oct. 26, 2006

(65) Prior Publication Data
US 2009/0062523 A1  Mar. 5, 2009

(30) Foreign Application Priority Data
Apr. 18, 2005 (FI) .................................. 20050394

(51) Int. Cl.
*D21B 1/02* (2006.01)
*D21B 1/12* (2006.01)
*D21H 11/12* (2006.01)
*C08H 8/00* (2010.01)
*D21C 1/06* (2006.01)

(52) U.S. Cl.
CPC .. *C08H 8/00* (2013.01); *D21B 1/12* (2013.01); *D21C 1/06* (2013.01)
USPC .................. 162/99; 162/90; 162/27

(58) Field of Classification Search
USPC ............................... 162/27, 90, 99
See application file for complete search history.

(56) References Cited

U.S. PATENT DOCUMENTS

| | | | | |
|---|---|---|---|---|
| 2,708,160 A | * | 5/1955 | Aronovsky et al. | 162/11 |
| 2,709,699 A | | 5/1955 | Wolf et al. | |
| 2,801,955 A | | 8/1957 | Rutenberg et al. | |
| 2,882,331 A | | 4/1959 | Zenczak | |
| 3,764,464 A | * | 10/1973 | Samuelson | 162/65 |
| 4,199,399 A | | 4/1980 | Villavicencio | |
| 4,511,433 A | | 4/1985 | Tournier et al. | |
| 4,652,341 A | * | 3/1987 | Prior | 162/79 |
| 4,790,905 A | | 12/1988 | Nivelleau de La Bruniere et al. | |
| 4,806,475 A | | 2/1989 | Gould | |
| 5,032,224 A | | 7/1991 | Ahluwalia | |
| 5,057,334 A | * | 10/1991 | Vail | 426/634 |
| 5,118,397 A | | 6/1992 | Sweeney | |
| 5,705,216 A | * | 1/1998 | Tyson | 426/478 |
| 6,036,817 A | | 3/2000 | Victor et al. | |
| 6,302,997 B1 | | 10/2001 | Hurter et al. | |
| 6,503,369 B2 | | 1/2003 | Rousu et al. | |
| 6,506,435 B1 | | 1/2003 | Lundberg et al. | |
| 6,620,292 B2 | | 9/2003 | Wingerson | |
| 2002/0112828 A1 | * | 8/2002 | Khan et al. | 162/72 |
| 2003/0041982 A1 | | 3/2003 | Prior | |
| 2004/0040677 A1 | * | 3/2004 | Prior | 162/4 |
| 2005/0051287 A1 | | 3/2005 | Chute et al. | |

FOREIGN PATENT DOCUMENTS

| | | |
|---|---|---|
| FI | 95158 B | 9/1995 |
| GB | 2 155 966 A | 10/1985 |
| GB | 2 155 966 A | 10/1985 |
| WO | WO 02/092669 A1 | 11/2002 |
| WO | WO 2005/106110 A1 * | 11/2005 |

OTHER PUBLICATIONS

Rydholm, Pulping Processes, 1965, Interscience Publishers, p. 412-417.*
Smook, Handbook for Pulp and Paper Technologists, 1992, Angus Wilde Publications, 2nd edition, Ch. 13, pp. 194-208.*
Smook, Handbook for Pulp and Paper Technologists, 1992, Angus Wilde Publications, 2nd edition, chapter 9.*
Rydholm, Pulping Processes, 1965, Interscience Publishers, p. 764-765, 992-1023, and 677-692.*
Applicant response to EPO in copending EPO application, Mar. 2011.*
European Search Report issued Aug. 5, 2010, in EP 06725879 8.
Office Action dated Jul. 29, 2011 for corresponding Chinese patent application No. 200680012912.4.
Office Action dated Mar. 15, 2012 for corresponding Canadian patent application No. 2,603,645.

* cited by examiner

*Primary Examiner* — Anthony Calandra
(74) *Attorney, Agent, or Firm* — Birch, Stewart, Kolasch & Birch, LLP

(57) ABSTRACT

The objective of this invention is a method for separating cellulosic fibres, hemicellulose and lignin from parts of plants containing these, such as stems, leaves and seed coats or hulls of cereal, oilseed, fibre or grassy plants. After appropriate pre-treatments the material is heated in an alkaline solution at lower temperatures than used in the traditional cellulose manufacturing. After this heat treatment, the fibrous and other undissolved materials are separated from the solution and subsequently ground in wet condition, using preferably chafing treatments. For improving the separation, surface active substances can be included in the alkaline heat treatment solution.

19 Claims, No Drawings

METHOD FOR SEPARATING THE MAIN COMPONENTS OF LIGNOCELLULOSIC MATERIALS

The objective of this invention is a method to separate the main components of lignocellulosic materials, such as cellulose, hemicellulose and lignin, from these materials and from each other, for utilizing some or several of the components as raw materials in industrial processes or as ingredients of foods or feeds, or for purifying a separated component. Materials to be treated can be straws, stems or leaves of cereal, oil or fibre plants, by-products of agricultural or industrial processing of these plants or parts of the plants, such as hulls or coats of seeds, or stems or other parts of grassy plants. The method can also be applied for purification of fractions separated from parts of woody plants or of comparable materials.

The economically or technologically most valuable component of these materials is usually cellulose fibre. Separation of it from woody materials is well established technology performed in large scale processes, but especially purification of it from lignin residues after the separation process without significant environmental problems is a subject of continuing development. For separating cellulose from adhesive components lignin and hemicellulose in alkaline processes, treatments performed at temperatures of at least 160° C. are usually needed, and the glass transition temperature range of the said adhesive complex is 130-190° C.

For processing cellulose from straw, similar methods as those used for woody materials are mainly used. The most common method, sulphate cellulose process, includes recirculation stages of chemicals, whereby hemicellulose and lignin are incinerated for obtaining energy, and the alkali is regenerated from the ash in the caustic soda process. When utilizing straw, problems arise from silica components deriving from the plant material. They tend to form mineral fouling on the surfaces of evaporators and caustic soda boilers. These layers weaken the heat transfer and they are difficult to remove. For minimizing the investment and processing costs or due to the silica fouling problem, many of the presently operating straw cellulose factories do not apply chemical recovery stages, or the recovery is performed incompletely. These factories create thus considerable environmental disadvantages by water pollution, and for this reason has the processing of straw to cellulose been closed in most of the European countries. Also in countries outside Europe limitations have been set for water pollution of these factories, which has created a threat of closing their operations. In the sulphite cellulose process, at least one half of the lignin and the main part of the hemicellulose of the raw material enters in the processing liquid and causes environmental pollution, unless no economical methods are available for their utilization and sufficient market for the products of such utilization. Recovery of hemicellulose and lignin from cellulose processes for other utilization than production of energy is scarce and performed only in small scale.

As compared to cellulose or paper made from wood cellulose or from mechanically pulped wood, cellulose and paper made of straw or comparable other lignocellulosic material have in general an inferior quality. This depends in part of the shorter length of the cellulosic fibres obtained by the presently available techniques, in part of the high content of lignin and associated other components.

Attempts have been made to replace traditional processing methods by faster and continuous methods. An often recommended method has been steam explosion, whereby the material is heated for a short time at a high temperature and pressure, and the pressure is suddenly released, which leads to decomposition of the material due to the rapid evaporation of water. According to the results published from an European Éclair research programme (AGRE-0044), a material yield of 61% has been reached, but in several information sources it has been stated, that separation of the various components from the resulting solid material is difficult. A higher yield, 88% of unbleached pulp, has been obtained using cooking extrusion. The mean length of fibres has been 1 mm, and the mechanical properties are reported to be better than those of waste paper pulp used in processing fluting paper. The mean length reported is substantially shorter than that of the native material. A presupposition for processing the pulp to paper is a removal of coarse particles. In both of these methods, a problem is water pollution.

For processing cellulose and hemicellulose containing material for food or feed use from straw and from other agro-fibre materials, several methods have been developed. The most common of them are based on alkaline extraction at high temperatures and pressures, combined with the use of an oxidizing chemical, usually hydrogen peroxide (U.S. Pat. No. 4,806,475) or oxidizing gases (U.S. Pat. Nos. 5,118,397 and 6,620,292) for separating lignin. Thermo-mechanical methods also are applied resulting to an incomplete separation of lignin, and for removal of the residual lignin, oxidizing treatments are applied. Use of phenolic compounds (U.S. Pat. No. 4,511,433), solvents such as diols, alkanol amines and sulfoxides (U.S. Pat. No. 4,790,905) and formic acid (U.S. Pat. No. 6,503,369) has been presented, but with most of them, subsequent bleaching with oxidizing chemicals is required. For reducing the amount of oxidizing chemicals needed for bleaching, enzymatic decomposition of hemicellulose has been used.

The invention thus aims at solving the problem of producing cellulosic fibre material in particular from non-wood materials by a simpler procedure with reduced number of successive steps, by use of mainly lower temperatures than conventionally applied for cellulose pulping processes, and obtaining a final product mostly preserving the original length of the cellulosic fibres. The solution according to the invention is a method of fractionating a lignocellulosic material or a material obtained therefrom, which is characterized in that it comprises the steps of:

heating the material in an alkaline solution of a pH above 9.0 at a temperature below the glass transition temperature of the hemicellulose-lignin complex, draining the material to obtain a heat-treated wet material, and subjecting the heat-treated wet material of a pH above 9.0 to grinding.

Alternatively the method according to the invention solving the above defined problem is a method of fractionating a lignocellulosic material or material obtained therefrom, which comprises the steps of:

heating the material in an alkaline solution of a pH above 9.0 at a temperature below 130° C., draining the material to obtain a heat-treated wet material, and subjecting the heat-treated wet material of a pH above 9.0 to mechanical separation or grinding, to obtain separated cellulosic fibres substantially free of hemicellulose and lignin.

Preferably the pH at the heating step as well as at the subsequent mechanical separation and/or grinding steps is above 11, and may be especially in the heating step in the range of 12 to 14 or more. In the latter case the pH at the mechanical separation or grinding steps is the same or at most slightly lower if some hot water is added to assist in the draining and/or a small amount of water is added to improve the efficiency of grinding. Generally the added water would lower the pH of the material by 1.0 pH unit at most, preferably by 0.5 units or less. The mechanical separation, if applied, may comprise classification such as sieving, hydrocyclone, centrifugation or like operations either preceding and/or following grinding, or supplanting grinding entirely.

It is possible that lignocellulosic material is pretreated before the process according to the invention. Such pretreatment may comprise conditioning the material in a mildly alkaline solution and possibly water, and separating the lignocellulosic solids, e.g. by screening, for further treatment according to the invention.

The alkaline solution may contain sodium hydroxide or potassium hydroxide, as well as basic constituents recovered from the process liquids. Advantageously one or several surface active substances can be added to the alkaline solution, the surface active substance then being an anion active compound, a non-ionic substance or an ampholytic compound.

The alkaline solution preferably consists of sodium and/or potassium hydroxide and, optionally, one or more surface active agents and/or constituents recovered and circulated in the process.

The heat treatment in the alkaline solution may be less than 6 hours, preferably about 1 to 4 hours. After draining a small amount of water, preferably 0.5 to 3 times the weight of the drained wet material, is added to the latter, to improve the efficiency of the subsequent grinding. The grinding may be performed by using a chafing mode of operation. However, the process may proceed without such addition of water, the separation and/or grinding operations then occurring at the same pH as the preceding heating step. After the separations and/or grinding the fibrous product may be washed with water.

An advantage of the mild process the main part of the cellulosic fibres, i.e. more than 50% and preferably more than 70% are not broken. Also the silica crystals or needles of the material remain intact. The final product of the invention is fibrous cellulose substantially free of hemicellulose and lignin.

As noted above, the process according to the invention is intended in particular for the treatment of non-wood lignocellulosic materials. The lignocellulosic material to be treated may be the hull or bran fraction obtained in the treatment of cereal grain, or straw, stems or other parts of cereal, oilseed, fibre or grassy plants. The product contains at least 80% of cellulose, the rest being hemicellulose and/or lignin residues. More advantageously, fibrous cellulose substantially free of hemicellulose and lignin is obtained.

The temperature for the heating in the alkaline solution is mainly below 130° C., i.e. below the lower limit of the glass transition temperatures of the hemicellulose-lignin complex. Preferably the material is heated at a temperature below 120° C., more preferably within the range of 90-110° C.

In the research now performed it has been surprisingly observed, that by alkaline treatments of lignocellulosic materials at lower temperatures than in the conventional cellulose process and below the glass transition temperature range, the main part of hemicellulose and lignin can be dissolved, and cellulose fibres can be separated using mild mechanical treatments and in a way where this mechanical treatment does not break the fibres. Materials, which have a high water binding capacity absorb the alkaline solution rapidly, and thus the dissolving is also starts rapidly. For other materials it is advantageous to use an excess of the alkaline solution especially at the initial stage, whereby the viscosity of the solution only slightly elevates from that of the water. Hereby the transfer of the reagents occurs mainly by convection, which is a more rapid mechanism than diffusion through swollen hemicellulose layers in the conventional methods. The convective mass transfer can further be enhanced by including surface active agents into the reagent solution. They speed up the penetration of the reagent solution into the solid material to be treated. Provided that the amount of the alkali in relation to the lignocellulosic material and pH of the solution are sufficiently high, increasing the water content of the mixture prompts the separation of the components of the lignocellulosic material, as well when added to the heating solution as when being ground.

In microscopic control it has been verified, that in this treatment lignin partly dissolves, partly separates as solid particles of microscopic size or as agglomerates consisting of hemicellulose and lignin. Simultaneously a part of hemicellulose dissolves, and cellular structures adhering to the cellulosic fibres start to separate in layers, which on continuing heating further disintegrate to agglomerates of a few cells, cell wall residues or other small particles. After separation or weakening of the adhesive layers, the further separation of components from each other can be achieved by mechanical treatments in wet state.

The undissolved solids can now be separated from the liquid phase by draining, screening, pressing or centrifugation, after dilution of the mixture if needed to improve the separation. The solids separated are subjected to grinding, preferably by using chafing treatments. Cellulose fibres are thereby loosened from the adhesive components and from each other. It has also been observed, that the cellulose fibres are at this stage coated with a gel layer, which weakens the chafing effect of the grinding. The gel layer can be at least partly removed by dilution with hot water. If the suspension has not been diluted before separating the solids, adding at this stage a small amount of free water, the gel is in part dissolved or broken, and the cellular fibre beneath will now more easily fix to the surfaces of the grinding elements and to other solid particles improving the chafing effect. For effective separation and for avoiding breaking of the cellulosic fibres, pH of the mixture should be during the grinding above 9.0, preferably above 11.0. The ground material is now subjected to water washing, the solutions obtained may be combined with the previously separated liquid phase, and the combined liquids or some parts of them are further directed to recovery of hemicellulose, lignin, and for recovery or recirculation of processing chemicals.

For separating cellulose fibres from other components, it is advantageous to perform the heating and grinding operations under conditions where the other components are either dissolved or are disintegrated to amorphic solids or to small particles. If the main purpose is to separate hemicellulose, it can be performed either by separating after the heat treatment the undissolved solids by diluting the suspension with hot water to a viscosity at which it can be rapidly drained, screened or decanted, or limiting the dissolving treatment to a stage where the cellulosic fibres are still for their main part joined together as sheet-like structures, and the pigmented cells are not yet disrupted. For further separation of the components, classifying operations known as such, for example sievings, hydrocyclone treatments, centrifugations and foam separation, can be used. The dissolved hemicellulose can be separated from the solution when needed by acid precipitation. The dissolved lignin partly separates as microscopic particles when the solution is evaporated or allowed to cool, in part follows the cellulose and hemicellulose fractions.

Before the said separation operations, for some lignocellulosic materials preceding mechanical or dissolving operations are advantageous or necessary using wet or dry methods known as such. They can include, among others, removal or soil, sand or other mechanical impurities, size diminution and classifications. Similarly, for some materials it is advantageous to perform removal of starch and protein, to simplify the subsequent treatments.

The method can also be used for diminishing the breaking of fibres in the process. It has been observed in this study, that due to mechanical forces the fibres are broken easily when they still are bound to supporting cellular structures or to the hemicellulose-lignin-complex. Since the water binding capacity of hemicellulose is greater than that of cellulose fibres, swelling of hemicellulose causes tension at the interface and/or leads to shifting at the interface. This shifting loosens the cellulose fibres from the adjacent hemicellulose-lignin complex or from the supporting cells, which are often separated in sheet-like layers. It is also evident, that reducing interfacial tension by surface-active chemicals added has enhanced the penetration of the liquid into the lignocellulosic structure, and also enhanced the removal of components loosened. This is indicated by the increase of lignin particles of microscopic size in the suspensions. Surface active compounds have probably also partly solubilized the wax layer on the particle surfaces and thus improved the penetration of water solution into the structure.

The method has so far been tested for separation of the main components from oat and barley hulls, wheat bran, oat straw and leaf fraction of oat straw, but it is to be expected that a corresponding separation can be achieved when treating other non-wood lignocellulosic materials, such as straw or stems of other cereal, oilseed or fibre plants, stems or other parts of grassy or other plants. The method can also be applied for reduction of lignin content of pulp or cellulose made by traditional methods from wood by treating cellulose, chemical or mechanical pulp or chaff in a solution containing a surface active substance. For preparation of the alkaline solution, sodium or potassium hydroxide, basic salts of sodium and potassium, and alkaline solutions obtained from recirculation of the processing chemicals can be used. Surface active substances can consist of anion active, non-ionic or ampholytic tensides or mixtures of these. For improving the separation, enzymes hydrolyzing cellulose or hemicellulose can be added. Essential facts for implementing the method are presented in the examples given below, these being not limiting to the processing conditions, and in the claims.

Example 1

2.00 grams of oat hulls, corresponding to 1.80 grams of dry matter, were weighed in each of seven reagent flasks. Grains or parts of grains had been separated from the hulls. Reagents and water in amounts given in Table 1. were added. The surface active substance used was Teepol Super, supplied by Berner Oy, Helsinki, Finland, containing triethanolamine dodecylbenzene sulphonate, sodium alkylethersulphate, and iso-tridecanolethoxysulphonate. The flasks were closed and heated for two hours immersed in boiling water bath, with occasional shaking. In each batch, the treatment led to swelling of the hull, but the hull pieces did not disintegrate when heating, and regarding lots E and F not even in a light chafing in a mortar in drip-dry state. By removing the gel layer formed on the surface with adding a small amount of water, fixing of the swollen hulls on the chafing surfaces was improved which increased the chafing effect. Efficiency of grinding, as evaluated by scoring from 1 to 5, is presented in Table 1.

According to the results, factors improving the separation of the components have been concentration of the alkaline solution, surface active substance and the amount of water, the latter also when added during grinding. According to microscopy observations, the surface active component has enhanced the separation of hemicellulose from cellulose fibres and disintegrating as amorphic particles suspended in the solution.

TABLE 1

Fibre separation tests

| Test | Hulls, g dry subst. | KOH g | NaOH g | Surface active substance g | Water g | Decanted G | Dry subst. decanted g | Dissolved % of dry substance* | Separat. of fibre | Disintegr. of cell walls |
|---|---|---|---|---|---|---|---|---|---|---|
| A | 1.8 | 0.168 | | | 4.2 | 0 | | | 1 | 1 |
| B | 1.8 | 0.168 | | 0.04 | 4.2 | 0 | | | 2 | 2 |
| C | 1.8 | 0.336 | | | 8.2 | 0 | | | 4 | 3 |
| D | 1.8 | 0.336 | | 0.08 | 8.2 | 0 | | | 4 | 4 |
| E | 1.8 | 0.336 | | | 16.2 | 6.49 | 0.428 | 40.6 | 4 | 3 |
| F | 1.8 | 0.336 | | 0.08 | 16.2 | 8.69 | 0.527 | 30.8 | 4 | 4 |
| G | 1.8 | | 0.24 | 0.08 | 16.2 | 8.63 | 0.611 | 37.7 | 5 | 5 |

*(Calculated soluble dry substance in the total amount of water, subtracted the weight of chemicals and Carbon dioxide absorbed in drying) × 100/dry substance of hulls

Example 2

To 23.4 g of oat hulls, from which grains and parts of grains were removed, 234 mL of 0.75 M (42 grams/litre) potassium hydroxide and an amount of Teepol Super surface active substance corresponding to 2.24 g of dry matter was added. The mixture was heated for two hours immersed in a boiling water bath, with occasional mixing. The mixture was screened when hot, giving 100 mL of clear solution. The solution separated had a pH value of 14 and contained 40 mg organic dry matter/mL. By treating separated solid material by chafing the main part of cellulosic fibres was separated from other types of cells or their fragments, based on the particle size and differences in the density, but for separation several stages are needed. A substantial part of the fibres were not broken in the grinding treatment and had their original shape and dimensions, as indicated by the sharpening and intact ends of the individual fibres. The main part of the fibres had a diameter of 15 to 20 µm, and a length of 500 to 1500 µm. Microscopically it was observed, that the crystals and needles of silica compounds had not dissolved in the treatment, but were loosened from the botanical structure without breaking.

Example 3

From oat straw, the internodes without leaves were separated and cut in pieces of about 3 cm. An excess of 0.75 M (30 grams/litre) sodium hydroxide solution containing 0.8% of anionic surface active substances was added. The mixture was heated for two hours immersed in a boiling water bath. The swollen solid material was ground by a chafing treatment. In this treatment the cellulosic fibres had separated from the other solid material. The main part of the fibres had a thickness of 7 to 15 μm, and a length of several millimetres, even up to the total length of the piece of straw taken for the treatment. In addition, the mixture contained fibrous particles which were thinner or thicker than the dominating type of fibres, fragments of cells, and small-sized particles containing principally lignin.

Example 4

To 1.5 grams of wheat bran (Ravintoraisio Oy, Raisio, Finland) 13.5 mL of 0.2 M (21.2 grams/litre) sodium carbonate solution was added, and the mixture was held at room temperature with occasional shaking. Solid material was separated by screening, whereby 9 mL of turbid suspension having a viscosity close to water was obtained. The solid material was suspended in 20 mL of water and allowed to stand for 2.5 hours, and the screening was repeated. The amount of suspension now separated was 15 mL. From both of these suspensions, starch was rapidly sedimented. To the solid material from these pretreatments, 12 mL of 0.75 M (30 grams/litre) sodium hydroxide solution was added, and the mixture was heated by immersing in boiling water bath for two hours. In the third screening now performed, 9 mL of liquid was separated. When grinding the solid residue by chafing, sheet-like cellular structures were separated in layers. In addition, single short cellulose fibres and several types of cellular fragments were separated. Intensively pigmented cells had in this treatment remained for their main part intact and fixed on foil or sheet-like structures. From the suspension separated in the third screening, hemicellulose was separated by acidification as a white fine-particle precipitate. When concentrating the liquid, also lignin was separated as a yellow fine-particle precipitate.

Example 5

3.8 g of barley hulls (Danisco A/S, Jokioinen, Finland) were mixed with 30 ml of 0.75M (30 grams/litre) sodium hydroxide solution and incubated in a boiling water bath for four hours. The hulls rapidly absorbed the water added resulting initially a dough-like consistency in the mixture, but during heating the viscosity diminished gradually. After two hours of incubation, a sample of 4 ml was taken and ground as such in a mortar. Cellulose fibres were nearly completely separated from the plant tissue and from each other. Diluting the ground sample with water to fourfold volume resulted in gelling of the hemicellulose. Continuing incubation of the main part of the batch, the viscosity further diminished to gruel-like texture. The mixture was now diluted to twofold with hot water, mixed with shaking, and the solid material was separated by screening. A clear brown liquid was separated, from which on cooling brown pigments of varying sizes separated. The pigments had in microscopy a bright yellow fluorescence thus indicating a high content of lignin. On diluting the solution, less hemicellulose was precipitated than after two hours of incubation, and no gel was formed. The solid fraction was ground in a mortar, and the fibres washed three times with water. The mean diameter of cellulose fibres separated was in wet state 8 to 15 μm, and in dry state 4 to 8 μm, the dominating length was from 400 to 600 μm, range 150 to 1000 μm. The main part of the fibres had preserved their stiffness, and there were no signs of breaking of individual fibres, as indicated by the intact ends of fibres. They had on the surface clearly observable fibril ends and fluorescent spots or stripes of lignin.

The invention claimed is:

1. A method of fractionating a non-wood lignocellulosic material, said method comprising the steps of:
   (a) heating the material, without chemical pretreatment, in an alkaline solution of a pH above 9.0 at a temperature of at least 90° C. but below the glass transition temperature of the hemicellulose-lignin complex,
   (b) continuing heating in accordance with step (a) up to at least initial disintegration of cellular structures adhering to cellulosic fibres,
   (c) draining the heat-treated material from step (b) to obtain a liquid phase comprising a dissolved fraction and a drained wet material, and
   (d) subjecting the drained wet material from step (c), having a pH above 9.0, to grinding to obtain a fibrous fraction with a content of at least 80% of cellulose, the main part of cellulosic fibers in said fraction not being broken.

2. A method according to claim 1, wherein the alkaline solution contains sodium hydroxide or potassium hydroxide and may contain constituents recovered from the process liquids.

3. A method according to claim 1 or 2, wherein the alkaline solution contains one or several surface active substances.

4. A method according to claim 3, wherein the surface active substance is an anion active compound.

5. A method according to claim 3, wherein the surface active substance is a non-ionic substance.

6. A method according to claim 3, wherein the surface active substance is an ampholytic compound.

7. A method according to claim 1, wherein the alkaline solution consists of sodium and/or potassium hydroxide and, optionally one or more surface active agents and/or constituents recovered and circulated in the process.

8. A method according to claim 1, wherein the heat treatment is less than 6 hours.

9. A method according to claim 1, wherein the grinding is performed by using a chafing mode of operation.

10. A method according to claim 7, wherein water is added to the drained wet material obtained at step (c) in an amount of 0.5 to 3 times the weight of said wet material.

11. A method according to claim 1, wherein the heat-treated wet material obtained by draining is subjected to grinding directly, without any intermediate treatment.

12. A method according to claim 7, wherein the silica crystals or needles of the material remain intact.

13. A method according to claim 1, wherein the lignocellulosic material to be treated is the hull or bran fraction obtained in the treatment of cereal grains.

14. A method according to claim 1, wherein the lignocellulosic material to be treated is straw, stems or other parts of cereal, oilseed, fibre or grassy plants.

15. A method according to claim 1, wherein dissolved lignin is recovered from the liquid phase obtained at step (c) by cooling or evaporation.

16. A method according to claim 1, wherein the pH of the alkaline solution at step (a) is 12 or more.

17. A method for the separation of cellulosic fibres from a non-wood lignocellulosic material, said method comprising the steps of:
   (a) heating the material, without chemical pretreatment, in an alkaline solution of a pH above 9.0 at a temperature of 90 to 130° C., (b) continuing heating in accordance with step (a) up to at least initial disintegration of cellular structures adhering to cellulosic fibres,
(c) draining the heat-treated material from step (b) to obtain a drained wet material,
(d) adding water to the drained wet material obtained at step (c) to obtain an aqueous material having a pH above 9.0, and
(e) subjecting the aqueous material from step (d) to grinding, to obtain separated cellulosic fibres substantially free of hemicellulose and lignin.

18. A method according to claim 17, wherein the material is heated at a temperature of 90 to 120° C.

19. A method according to claim 18, wherein the material is heated at a temperature of 90 to 110° C.

* * * * *